Figure 1:
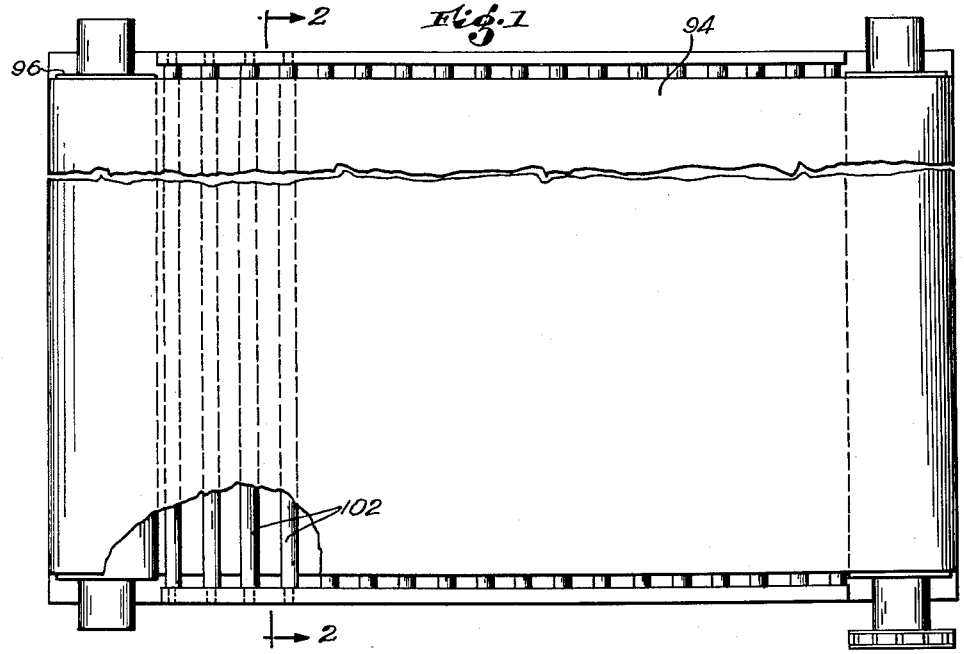

April 10, 1956  F. L. THAYER ET AL  2,741,472

AUTOMATIC CHECKING SCALE

Filed Oct. 12, 1949  6 Sheets-Sheet 1

INVENTORS.
Warren L. Thayer and Floyd L. Thayer
BY Kenway Jenney Witter and
Hildreth, Attys.

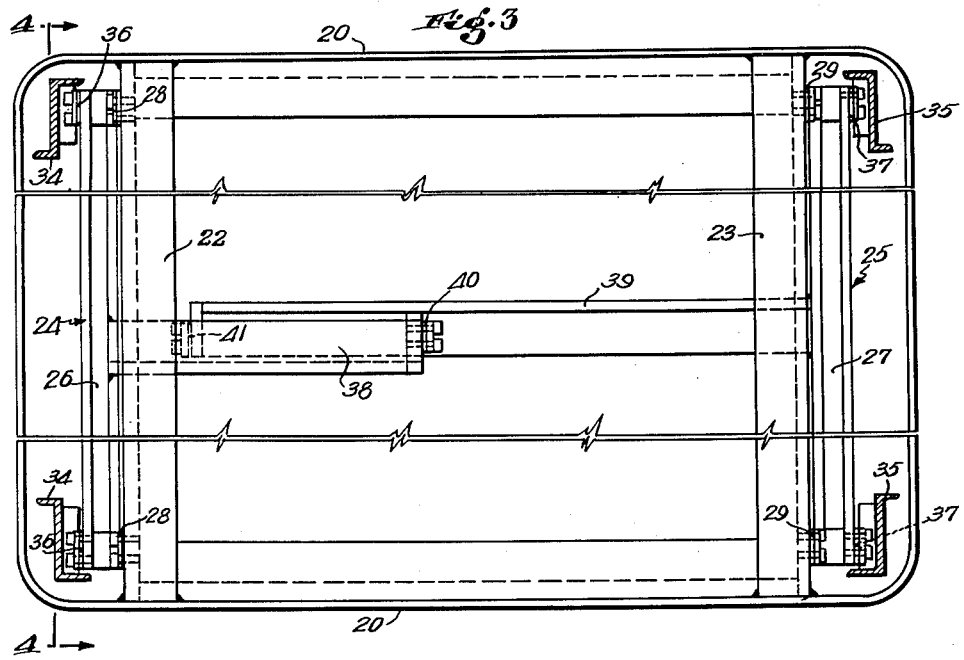
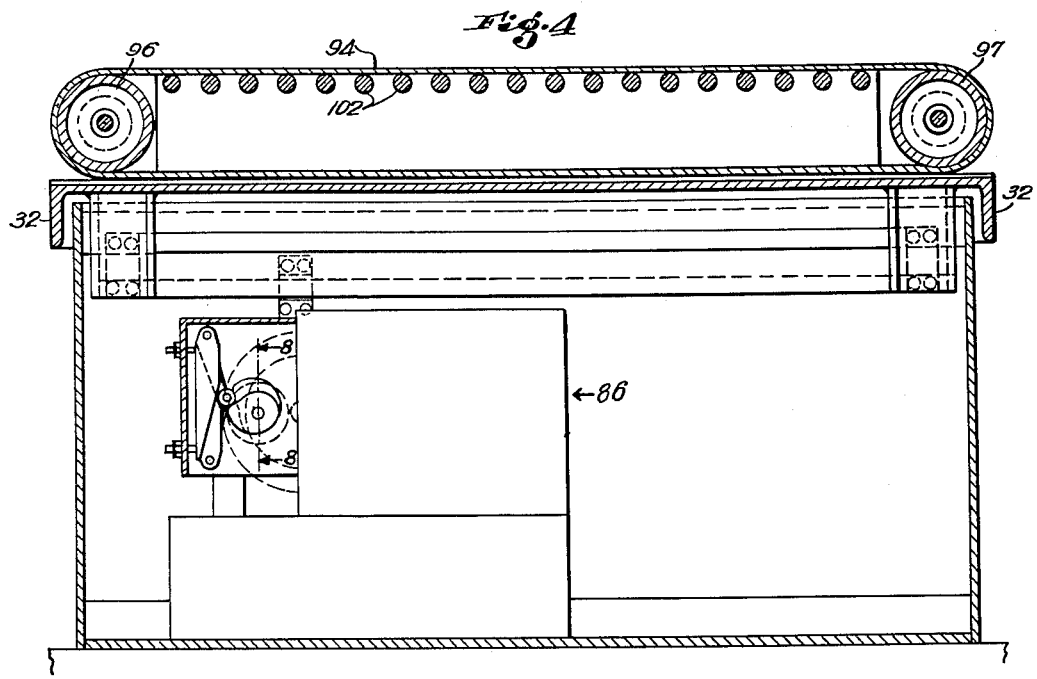

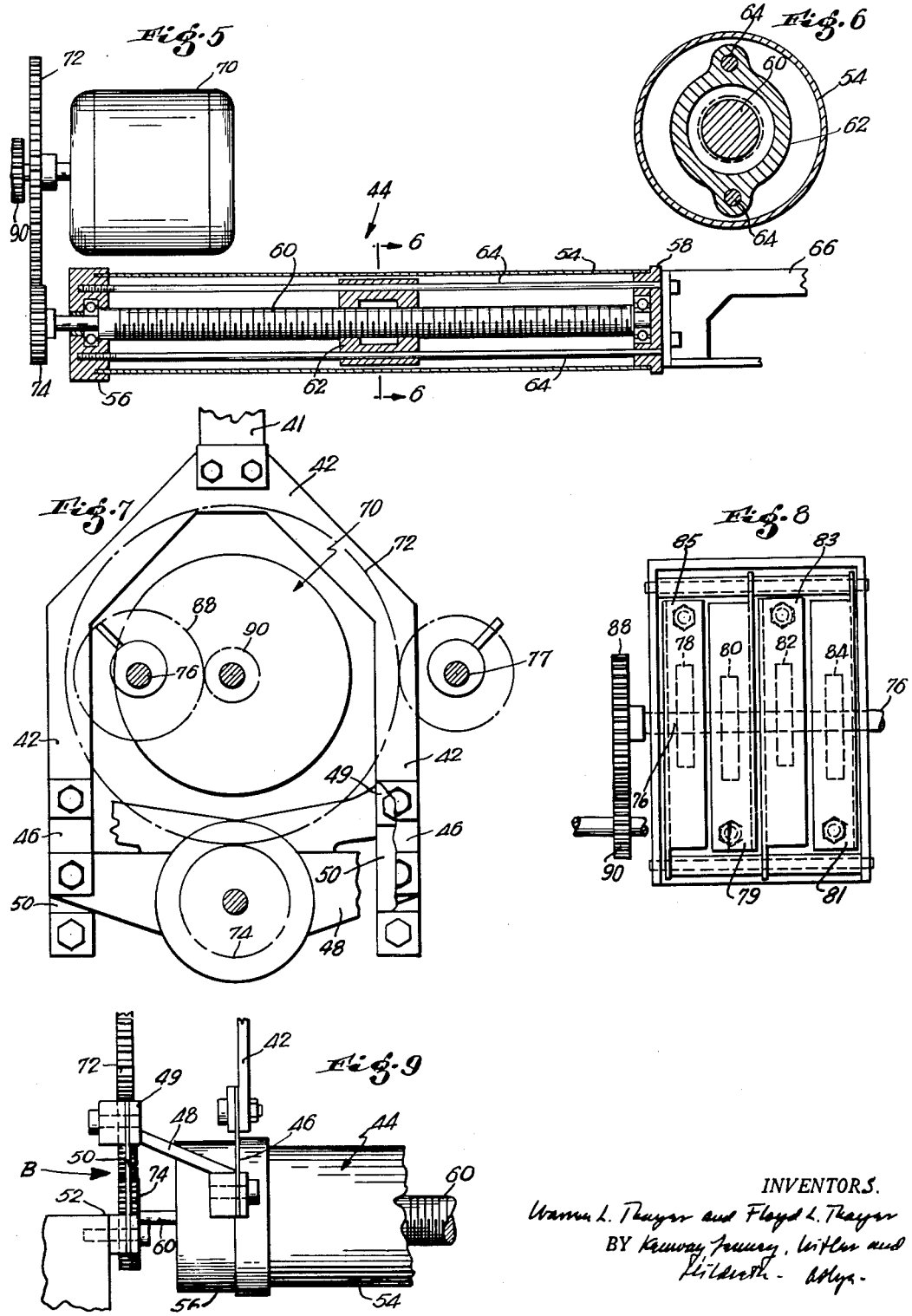

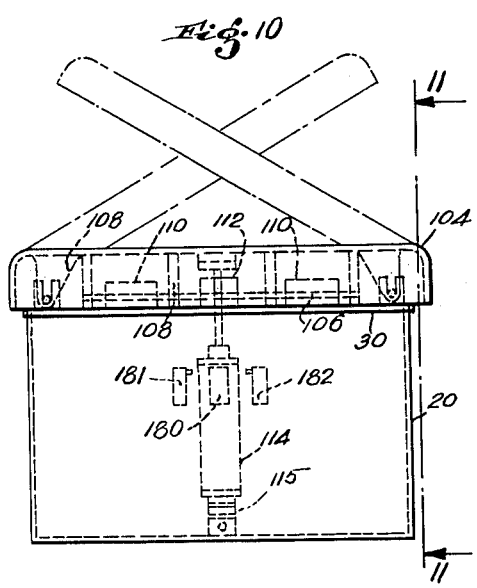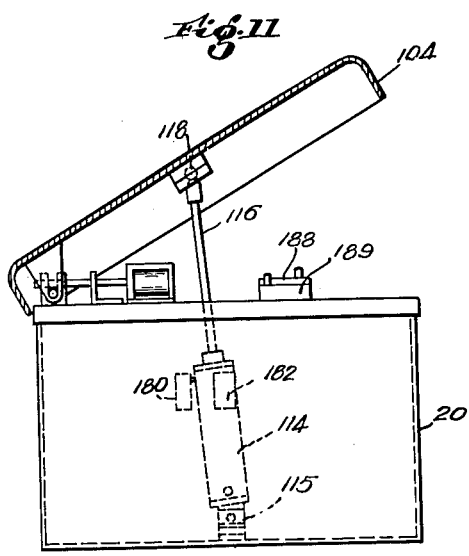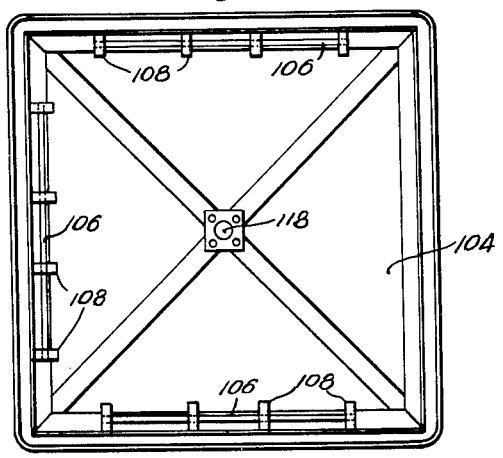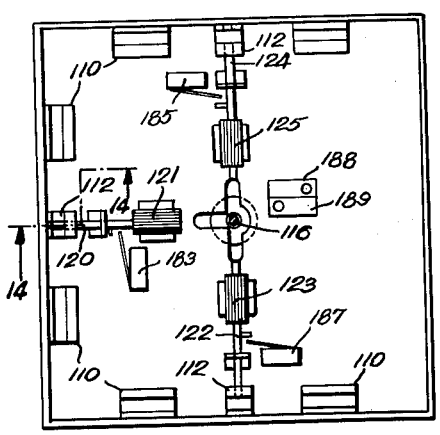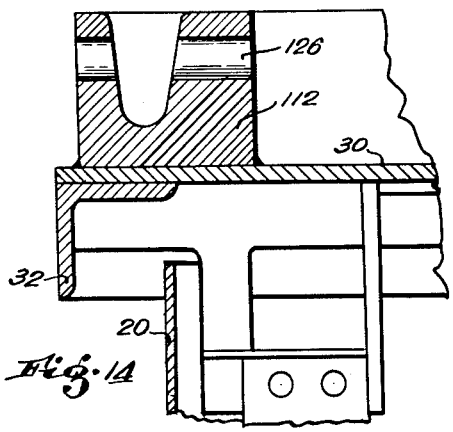

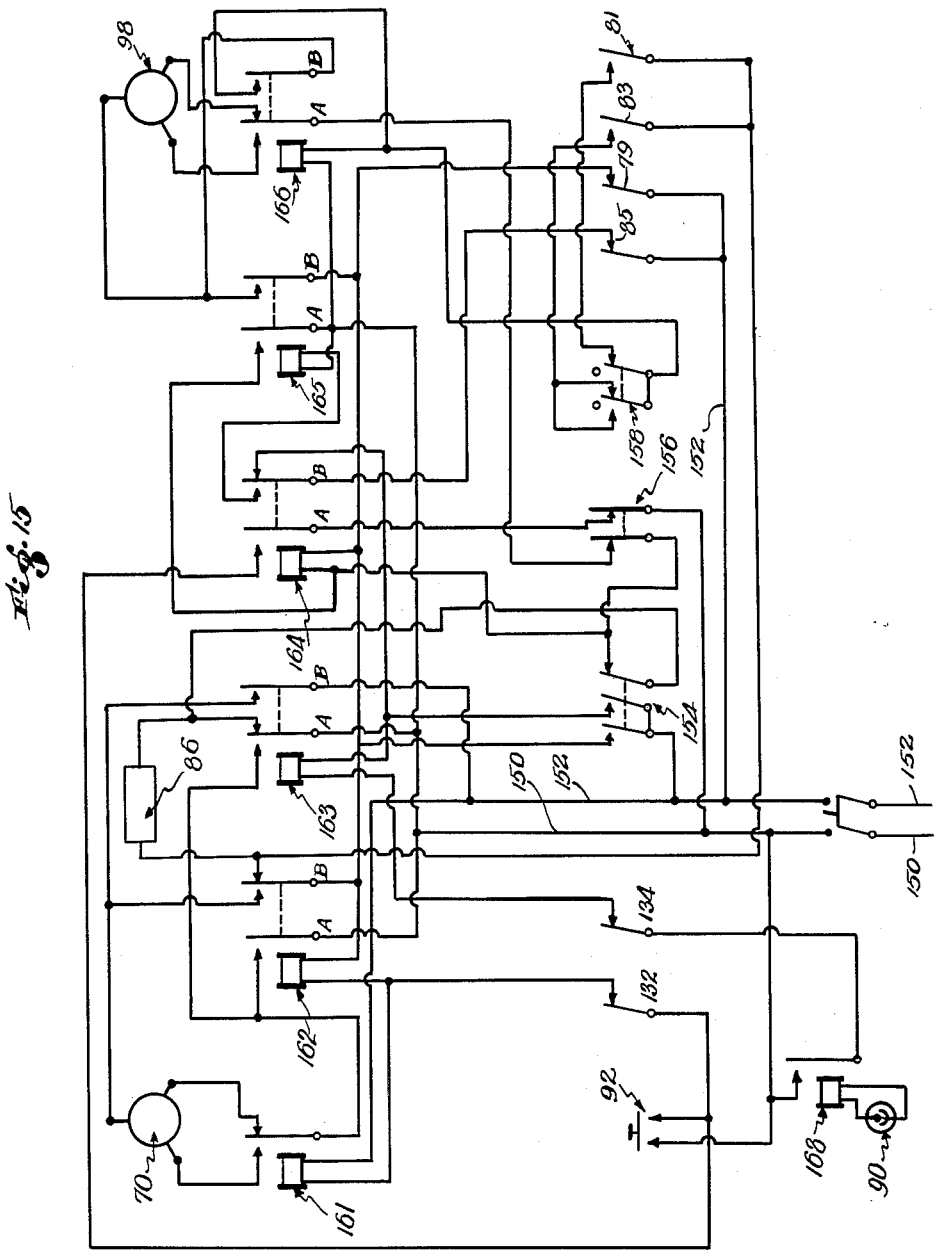

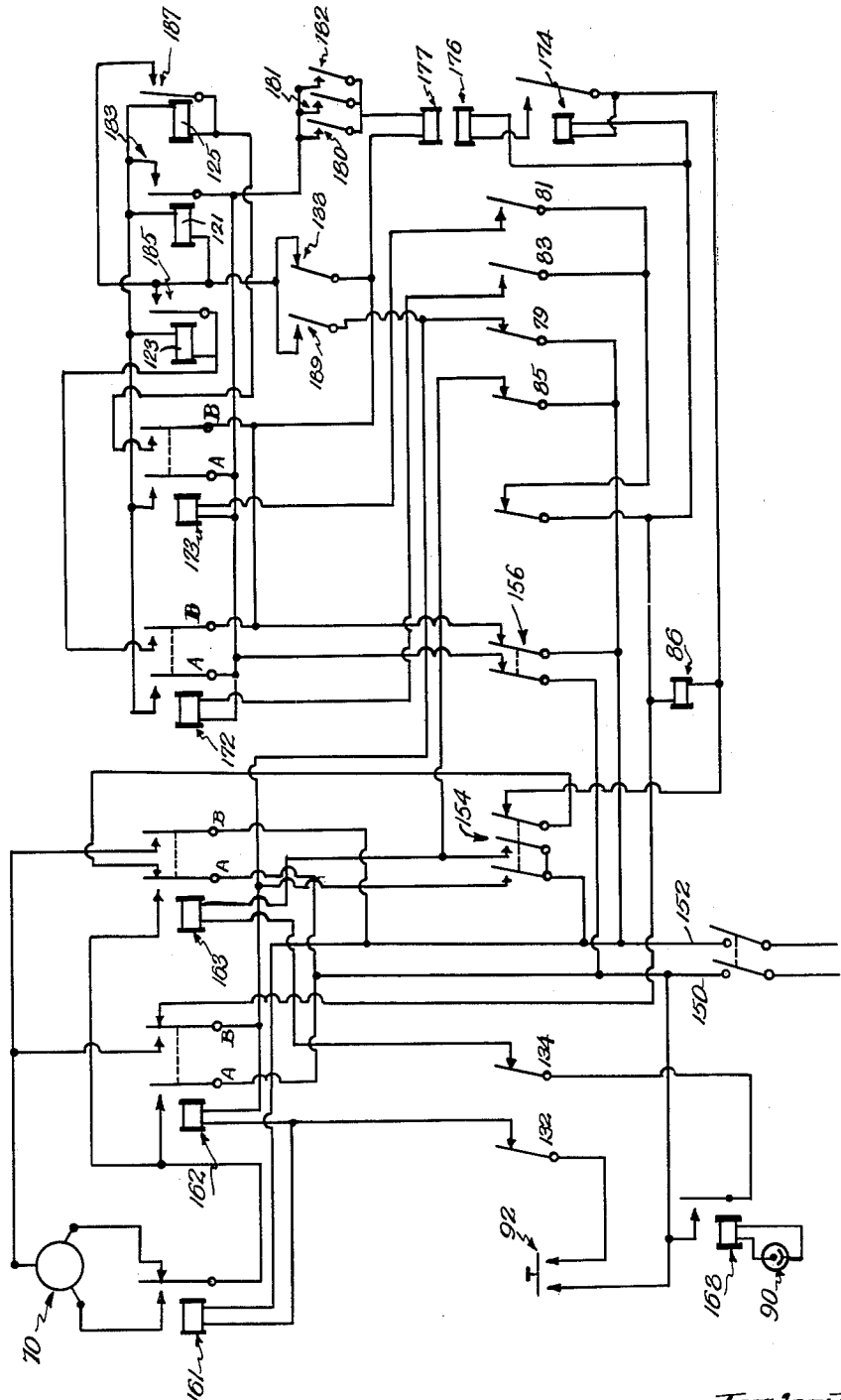

United States Patent Office 2,741,472
Patented Apr. 10, 1956

2,741,472

AUTOMATIC CHECKING SCALE

Floyd L. Thayer and Warren L. Thayer, Hingham, Mass.

Application October 12, 1949, Serial No. 121,040

12 Claims. (Cl. 265—56)

This invention relates to gravimetric scales and more particularly to automatic checking scales of the counter-balance type. In one aspect our invention consists in a novel counter-balance type scale construction by means of which the weight of an item is accurately determined without the necessity of waiting for the scale to stop motion whereby a substantial saving in time is effected. In another aspect our invention consists in such a counter-balance type scale adapted for check weighing and arranged in combination with automatic mechanism for selectively discharging items weighed by the scale in accordance with a predetermined standard, and at the same time automatically recording the actual weight of each item.

In many industries, particularly those in which materials such as cement, grain, fertilizer, sugar, coffee beans, and the like are bagged or packaged, it is the general practice to overload the bags or packages on an average upwards of 2% to insure against shipment of underloaded units. The percentage of overloading has long been of prime concern to such industries and much research and cost analysis has gone into reducing it to the barest minimum. In determining what the average overload percentage should be in any particular instance, many factors must be balanced against each other. First, the cost of accurate loading must be balanced against the value of the material that might be saved thereby. In industries such as the cement industry, the high speed automatic or semi-automatic loaders, loading at a rate of about 15 bags per minute, are accurate to within 1%. This means that the average overload percentage will probably be placed at around 1½% in order to avoid shipping underloaded bags. While such an overload percentage represents a substantial loss to the manufacturer, both by virtue of the material lost and by raising freight costs, nevertheless it is uneconomical for the manufacturer to attempt to load more accurately because the devices available for more precise loading are so slow and expensive to operate that their use is not justified. Assuming then, that the manufacturer has determined what his most economical loading equipment is in view of its speed, accuracy, etc., and the value of the material being packed, the manufacturer may then analyse the costs of check-weighing and benefits to be gained thereby. Without check-weighing or even with random check-weighing, the manufacturer must keep his overload average percentage substantially above the error margin of the loading machine, if he wants to be certain not to ship any underloaded units. However, if he check weighs the entire production line, then he can reduce the overload percentage, but here again various factors must be balanced against each other. If the checking scale causes substantial delay in the production line and extra labor costs, in order to attain an accuracy appreciably better than the loading mechanism, then for most materials such as cement, it is not practical to reduce the overload average to the point where check weighing is necessary. On the other hand, it will be seen that, if the checking scale can handle the entire production of the loading device without significantly extra cost and attain a high degree of accuracy as well, then the average overload may be reduced to a minimum depending mainly upon the cost of repackaging rejected units. Furthermore, if by use of a checking scale it were practical and inexpensive to record the actual weight of each bag in a manner acceptable to the Bureau of Standards, and to keep the loading operator constantly and accurately informed of the weight of the units he is loading, then it would be possible to market each bag at its true weight rather than being forced to indicate its weight on the bag at a round figure somewhat below the true weight.

Conventional checking scales hitherto employed are grossly inadequate for economical check weighing of most materials other than those of relatively high value. Spring type scales are notoriously inaccurate. They are obviously impractical as checking scales because they are not even as accurate on a commercial scale as the loading devices conventionally employed. Bench dial type scales are accurate, but require extra labor and are so slow that their use in checking is impractical. While automatic balancing pendulum type scales are somewhat faster than other conventional checking scales, they still lag far behind the capacity of the average loading device, attaining a maximum of about ten weighings per minute, and they are not considered as accurate as the conventional counter-balance lever scales with movable poise. Certain types of even arm scales or simple lever combinations thereof have been employed in check weighing wherein the unit to be checked is simply placed on the scale to see if it will lift the counter-weight or poise. While speed may be attained with such scales they have the disadvantage of not indicating the actual weight of the unit, as do those mentioned above, and also the unit must be properly located on the scale platform to attain maximum accuracy. Furthermore, since their weigh beam starts from a position of contact against a stop or trig loop, they are lacking in one of the important criterions of excellence in weighing, namely that the weigh beam should be free swinging.

Therefore, the general object of our invention is to provide a scale capable of rapid, accurate and inexpensive check weighing. A more specific object of our invention is to provide an automatic checking scale capable of handling the entire output of a conventional high speed loading device for material such as cement and simultaneously recording the actual weight of each unit to an accuracy within ⅒ lb. A further object of our invention is to provide a checking scale of the accurate counter-balance movable poise type having a free swinging weigh beam but yet being capable of rapid weighing on the order of twenty weighings per minute and better.

Still further objects of our invention include: the provision of apparatus in combination with a high speed checking scale for automatically and selectively discharging units from the scale platform in accordance with a pre-determined standard; and the provision of a checking scale capable of rapid change to check weigh units of widely different weights.

In the accomplishment of these objects, we employ, in a preferred embodiment of our invention, a conventional multi-lever counter-balance type scale having a free swinging weigh beam and a movable poise thereon. In conjunction with these members, we provide means for automatically moving the poise along the weigh beam without adversely affecting the balance thereof, and substantially frictionless mechanism for actuating the poise moving means in response to signals indicated by the position of the weigh beam. When no weight is on the scale the weigh beam drops, makes a contact, and the poise is automatically moved inward along the weigh beam to a position representing a weight substantially below the weight of the units being check weighed. Then when one of the said units is placed on the scale, the weigh beam immediately rises, makes a second contact, and the poise is automatically moved outward along the weigh beam. It is a feature of our invention that the movement of the poise outward along the weigh beam is uniform in rate and that soon the poise counterbalances the weigh beam causing it to start dropping. As the weigh beam approaches the level position, the second contact is broken substantially without friction as will be described and the poise stops. The weight is read at this instant without waiting for the weigh beam to settle down. An additional feature of our invention is that a high degree of accuracy may be attained if the movement of the weigh beam is damped to a substantially critical degree whereby the force causing the weigh beam to drop is constant at the time the weigh beam breaks the second contact.

Further features of our invention include: (a) mechanism for driving the poise comprising a rotating screw shaft on the weigh beam driven by a gear which bears against the shaft precisely at the weigh beam fulcrum whereby friction on the weigh beam due to driving the poise is virtually eliminated; (b) a flexure plate scale platform suspension system whereby bearing friction is extremely small but yet the platform is capable of withstanding the impact of heavy weights without endangering the accuracy of the scale; (c) electric eye and mercury pool type frictionless contacts for actuating the poise driving mechanism; (d) electrical circuits adapted for rapid change from check weighing units of one weight to units of a substantially different weight; (e) a belt type discharge mechanism adapted to discharge units on the scale in one of two directions; and (f) a tilting platform type discharge apparatus adapted to discharge units on the scale in one of three different directions.

Figure 2:
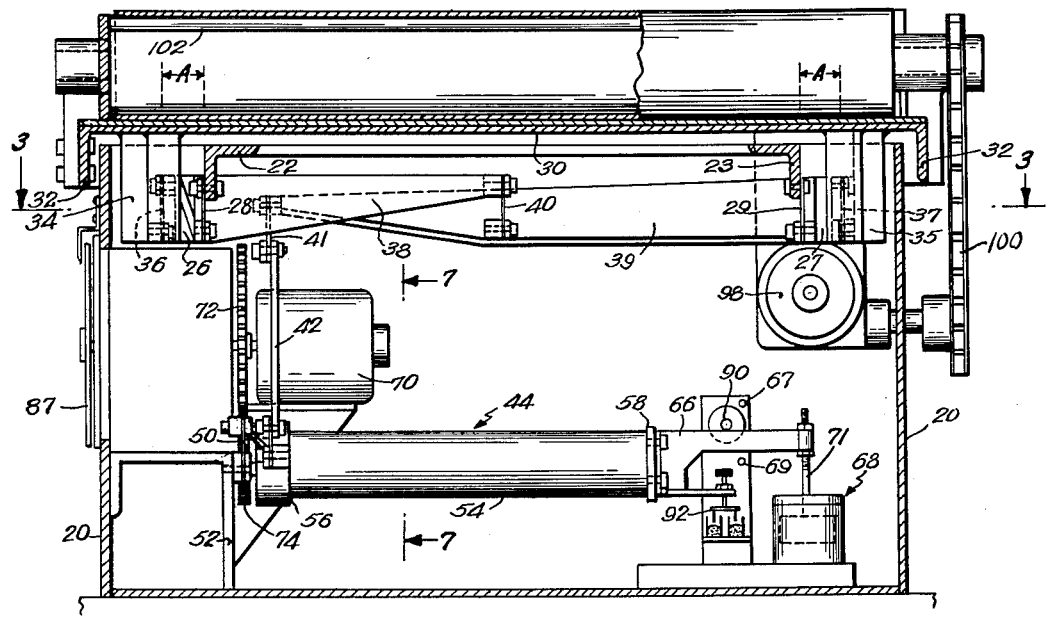

Further objects and features of our invention will best be understood and appreciated from the following detailed description of a preferred embodiment thereof selected for purposes of illustration and shown in the accompanying drawings in which:

Fig. 1 is a plan view of the scale of our invention showing a conveyor belt type discharge apparatus mounted on the scale platform, Fig. 2 is a sectional view in side elevation along the lines 2—2 of Fig. 1, Fig. 3 is a sectional plan view taken along lines 3—3 of Fig. 2 immediately below the scale platform and showing the suspension lever arrangement, Fig. 4 is a sectional view in front elevation along lines 4—4 of Fig. 3 diagrammatically illustrating the cam action for circuit control and the weight recording apparatus, Fig. 5 is a sectional view in side elevation of the weigh beam demonstrating the mechanism for driving the poise, Fig. 6 is a sectional view in end elevation of the weigh beam and poise taken along lines 6—6 of Fig. 5, Fig. 7 is a view in end elevation of the yoke suspension apparatus for the weigh beam and the gear trains for the drive motor indicated generally along lines 7—7 of Fig. 2, Fig. 8 is a sectional view in side elevation of the cam arrangement for circuit control along lines 8—8 of Fig. 4, Fig. 9 is a view in side elevation of the weigh beam suspension apparatus, Fig. 10 is a view in end elevation of the scale of our invention equipped with a tilting platform ejection apparatus, Fig. 11 is a partially sectional view in side elevation of the apparatus taken along the lines 11—11 of Fig. 10, Fig. 12 is a plan view from below, looking upward at the tilting type of ejection platform, Fig. 13 is a plan view from above of the retaining mechanism for the tilting ejection platform, Fig. 14 is an enlarged sectional view in side elevation of the retaining slot V-blocks for the tilting ejecting platform taken along the lines 14—14 of Fig. 13, Fig. 15 is a wiring diagram for the scale adapted for the belt type ejection system shown in Figs. 1–4, and Fig. 16 is a wiring diagram for the tilting platform ejection system.

In its general organization, the preferred embodiment of the checking scale of our invention herein described includes a base frame or case 20, a scale platform 30 with automatic discharging apparatus mounted thereon, scale platform supporting apparatus, weight determining and recording apparatus, and automatic controls for discharging items after they have been check weighed.

I. *Base frame*

The base frame or case 20 is composed of sheet steel and is formed in a substantially rectangular box shape having angle irons (not shown) on the inside for reinforcement. The top of the base frame 20 is open but its sides and bottom are entirely enclosed providing a dust-tight housing for the weighing apparatus and controls. Angle irons 22 integral with base frame 20 span the top of the base frame 20 and serve to support the scale platform 30 as will be described more in detail below.

II. *Scale platform*

The scale platform 30 comprises a flat metal plate of suitable rigidity, reinforced along its margins by angle irons 32 which overhang the top of the frame 20. Automatic discharging apparatus is mounted on the scale platform and will be described more in detail below.

III. *Platform supporting apparatus*

The platform supporting apparatus may be broadly classed as a two lever system. As is shown in Figs. 2 and 3, heavy angle irons 22 and 23 are secured to the frame 20 across its open top. Levers indicated generally at 24 and 25 in Fig. 3, are suspended from angle irons 22 and 23 respectively by means of fulcrum plates more fully described below. The levers 24 and 25 may broadly be described as torsion levers because they include transversely extending torsion rods 26 and 27 respectively having a fulcrum and short lever arm connectors at each end, and single long levers, or extension arms 38 and 39 respectively mounted between the two fulcrums on each torsion rod. With reference to Figs. 2 and 3 it will be seen that torsion rod 26 of the lever 24 is suspended from angle iron 22 by flexure plates 28 which provide fulcrums at each end of torsion rod 26 on the inner side of the said torsion rod and that on the outer side of the torsion rod, corner posts 34 depending from the two adjacent corners of the platform 30 are suspended from it by means of flexure plates 36. Thus the lever 24 is provided with a fulcrum depending from angle iron 22 on the inner side of and at each end of the torsion rod 26, and short lever arms roughly equal to the width of the said torsion rod between the flexure plates 28 and 36 on the other side opposite the fulcrums. The length of the short lever arms is designated in Figs. 2 and 3 by the dimension A. The connections which establish the fulcrum are made by means of suitably bolted spring metal flexure plates 28 depending from the angle iron 22 to form virtually frictionless fulcrum bearings. Another pair of flexure plates 36 are similarly bolted to the torsion rod 26 to form equally frictionless supports for the corner posts 34. Angle iron 23 supports the corner posts 35 of the platform 30, through lever 25 in a similar manner. Thus, corner posts 35 are suspended from each end of a torsion rod 27 by flexure plates 37 connected to the outer side of the torsion rod 27, and the torsion rod 27 in turn is suspended from angle iron 23 by flexure plates 29 connected to the inner side of torsion rod 27. The dimension A applies also to the short lever arm established between flexure plates 29 which serve as a fulcrum for lever 25 and flexure plates 37 which support corner posts 35.

Extension arms 38 and 39 of the levers 24 and 25 respectively are mounted on and extend inwardly from the torsion rods 26 and 27 respectively, and inter-connect midway between the axes of the fulcrums established by flexure plates 28 and 29 by means of a flexure plate 40 secured thereto by bolts in a conventional manner.

It will be seen that the flexure plate suspension arrangement herein described is virtually frictionless for slight angular changes and is extremely durable. Furthermore, it will also be noted that since the levers 24 and 25 support the platform 30 at its four corners, and the extension arms 38 and 39 interconnect midway between the fulcrum axes, the suspension system is designed in accordance with the "principle of equal multiplication" in scales and that when a unit is being weighed on the scale, its position on the platform 30 will not adversely effect the accuracy of the scale.

Arm 39 is substantially longer than arm 38 and its inner end extends past the point of connection of the flexure plate 40. Depending from the said inner end of the extension arm 39 and connected thereto by a flexure plate 41 is an inverted U-shaped draft rod 42 which serves to transmit the platform load to a weigh beam indicated generally at 44 in Figs. 2, 5 and 9. The draft rod 42 is in the form of a yoke, for reasons which will be explained as the description proceeds, and pivotally connects to each side of the weigh beam 44 by means of a pair of flexure plates 46 bolted to a cross brace 48 which is secured to the weigh beam 44.

IV. The weigh beam

The weigh beam 44 may be described broadly as a third class lever, that is, the load from the draft rod 42 is an upward force and is applied on the same side of the fulcrum as the power, or more specifically, the counterweight forces of the weigh beam 44. The fulcrum, therefore, must provide a downward force and to this end two flexure plates 50 are bolted to an inner brace 52 of the frame 20 and extending upwardly, connect to a forward and elevated extension 49 of the cross brace 48 which is mounted on the weigh beam. The flexure plates 50 are symmetrically spaced from the axis of the weigh beam for reasons which will be explained presently.

The fulcrum axis established by the flexure plates 50 is on a line passing through the centers of the plates 50. In this preferred embodiment of our invention, the flexure plates 46 are positioned slightly higher than the plates 50 when the weigh beam is level, and therefore the load pivot axis established by flexure plates 46 will be higher than the fulcrum axis when the weigh beam is level. This arrangement in a third class lever lends stability and means that a position of the weigh beam above or below the horizontal with the system in equilibrium will represent a calculable weight.

The weigh beam 44 comprises an aluminum tube 54, having a fulcrum block 56 in one end thereof, and a screw bearing block 58 in the other end. A screw 60 is mounted for rotation coaxially within the tube 54 and with one end passing through the fulcrum block 56 and its other end in bearings in the bearing block 58. A poise 62 is threaded to receive the screw 60 but is prevented from turning in rotation with the screw 60 by longitudinally extending slip rods 64 which are anchored in the end blocks and which pass through longitudinal holes in the poise 62 allowing it to travel longitudinally in smooth sliding relation thereto. Thus it will be seen that the poise 62 is provided with a dust-proof housing. This is an important feature in attaining continued accuracy because it is a simple matter to calibrate for dust on the weigh beam alone. This feature applies equally to other scales.

The bearing block 58 is provided with a tip extension 66 which serves as an actuating member for the weighing and discharge mechanisms to be described presently. The tip 66 also mounts a conventional dash pot type damping mechanism indicated at 68 in which a plunger 71 operating in a viscous medium in the dashpot serves to damp the motion of the weigh beam.

V. The poise motor

A motor 70 mounted directly above the weigh beam is provided for the purpose of driving the poise and the weight recording apparatus. It may be a constant speed reversible synchronous motor of the quick starting and quick stopping type. The motor 70 is geared directly to the screw 60 by means of a large gear 72 mounted on the motor shaft, which meshes with a gear 74 mounted on the end of the screw 60. With reference to Fig. 9, it will be seen that the gears 72 and 74 mesh in the area indicated by the arrow B and that this lies precisely on the fulcrum axis established by the flexure plates 50. The pitch circles of gears 72 and 74 may be seen in Fig. 7. It will now be seen that the said draft rod 42 is in the form of a yoke for the purpose of permitting the motor 70 to be mounted directly above the weigh beam 44, and that the fulcrum plates 50 are spaced apart for the purpose of accommodating the said gears 72 and 74 between them on the weigh beam center line. The gears 72 and 74 are not intermeshed in a tight fit but rather are given a slight clearance for the purpose of accommodating the swing of the beam which amounts to approximately 3° without causing binding between the gears.

This arrangement provides a poise driving mechanism which is substantially free of friction that might otherwise adversely influence the balance of the weigh beam.

Also geared directly to the motor 70 is a cam shaft 76 upon which cams 78, 80, 82 and 84 are mounted. For this purpose the shaft 76 is provided with a gear 88 which intermeshes with a gear 90 on the motor shaft (see Figs. 5, 7 and 8).

The motor 70 additionally serves to drive a shaft 77 which operates a printing recorder indicated at 86 in Fig. 4 which may be adapted both to print the weight of each unit and to totalize the weight of a number of bags. Thus, it will be noted that the poise 62, the cam shaft 76, and the printing unit 86 are all driven in unison by the motor 70, and may be calibrated to correspond to the weight indicated by the poise. In addition, a dial 87 (see left-hand end of Fig. 2) may be mounted on an extension of shaft 76 penetrating the walls of the frame 20 for the purpose of rendering visual indications of weight to an observer. It is obvious that any conventional remote control system (not illustrated) may be employed for giving weight readings to a remote observer such as the loading operator.

Shafts 76 and 77 are mounted on eccentrics for the purpose of re-positioning them as desired.

The motor 70 is controlled in operation by Microswitches 79, 81, 83 and 85 operatively associated with the cams 80, 84, 82 and 78 respectively, a photoelectric cell 90, and a two point mercury contact 92 operatively associated with the tip 66 of the weigh beam 44.

VI. Circuits controlling poise motor

When the scale is being used for check weighing, in order to save time, it is desirable to keep the poise at a position on the weigh beam representing a weight roughly near the expected weight of the units. For this purpose the cams 80 and 78 operate switches 79 and 85 to effect a low cut-off and high cut-off respectively for the motor. The cams 84 and 82 operate the switches 81 and 83 respectively for purposes of designating whether the units weighed are over or under an acceptable weight variation within the broad range established by cams 78 and 84. The photoelectric cell 90 is located adjacent to the tip 66 of the weight beam 44 in position slightly above the weigh beam when it is horizontal, and the mercury contact 92 is located below the tip 66 of the weigh beam in position to be closed when the beam is down.

When the platform 30 is empty, the beam 44 drops down and makes the mercury contact 92. This will close a circuit shown in Fig. 15 which includes a power line 150, the mercury contact switch 92, the coil of a double pole, double throw relay 162, the low stop Micro-switch 79, and a power line 152. The relay 162, thus energized, closes a circuit which comprises the power line 150, pole A of the relay 162, the motor 70, pole B of the relay 162, the Micro-switch 79 and power line 152. In parallel with the coil of relay 162 is a double throw, single pole relay 161 which when energized under these circumstances causes the motor 70 to drive the poise 62 inward in the conventional manner. Thereafter, the poise continues to travel inward until the cam 80 opens the Micro-switch 79, opening the said circuits.

When a unit is placed on the scale platform for check weighing, the weigh beam 44 immediately rises because of the inward position of the poise 62 on the weigh beam, and after rising past the horizontal, the weigh beam interrupts the beam of light to the photoelectric cell 90 which, by means of a relay 168 (see lower left-hand corner of Fig. 15), establishes a circuit which includes the power line 150, the relay 168, the coil of a double pole, double throw relay 163, the high stop Micro-switch 85 and the power line 152. Relay 163 in turn serves to close a circuit including the power line 150, pole A of relay 163, the motor 70, pole B of relay 163 and power line 152. Since the relay 161 is not operative under these conditions, the motor 70 drives the poise 62 out on the weigh beam 44, until the weigh beam drops below the photo-cell 90 or until the cam 78 opens switch 85, either of which will break the circuit to the coil of relay 163 causing it to de-energize and break the circuit to motor 70.

Of course, if the unit being weighed is of approximately correct weight, the poise 62 will start the beam 44 downward well before the cam 78 opens the switch 85. Thus when the beam drops below the photo-cell 90, the coil of the relay 163 is de-energized, breaking the circuit to the motor 70, and the poise stops. It is at this instant that the weight is recorded, and the discharging operation takes place. In the de-energized position, pole A of the relay 163 makes a new circuit which includes the power line 150, pole A of relay 163, the coil of another double pole, double throw relay 164, the low stop Micro-switch 79, and the power line 152.

Relay 164 has two functions. First, it closes a circuit to the coils of relays 161 and 162, causing the motor 70 to drive the poise 62 inward as has already been described. However, the circuit to the coils of relays 161 and 162 established by relay 164 by-passes the mercury switch 92, and therefore the motor 70 will drive the poise 62 inward until the low stop switch 79 is opened, regardless of the position of the weigh beam. The second function of relay 164, is to close a circuit which includes power line 150, the coil of an additional double pole, double throw relay 165, the high stop Micro-switch 85, and power line 152.

Relay 165, when energized, likewise has two functions. First it closes a circuit which includes power line 150, pole A of relay 163 (in the de-energized position), discharge motor 98, pole B of relay 165, the low stop Micro-switch 79 and power line 152. The second function of the relay 165 when energized is to establish a holding circuit for the coil of relay 164, which includes power line 150, pole A of relay 165, the coil of relay 164, the low stop Micro-switch 79, and the power line 152. By doing this, the relay 164 will remain energized and cause the motor 70 to drive the poise 62 inward until the cam 80 opens the Micro-switch 79 regardless of the photo-cell 90, or mercury switch 92. Since one of these circuits drives the discharge motor 98, and since they are not broken until the motor 70 causes the cam 80 to open switch 79, it will be seen that the discharge motor 98 should accomplish its function before the cam 80 opens switch 79. No harm would result if the unit being weighed happened to remain on the scale or if another unit is placed on the scale as the one already weighed is being discharged. Under such circumstances it is to be assumed the weigh beam 44 will be in the up position by virtue of the inward position of the poise 62 on the weigh beam and that the photo-cell relay switch 168 will thereby be closed. Then when the Micro-switch 79 opens, relays 164 and 165 de-energize. Then with relay 164 in the de-energized position, its pole B completes a circuit including power line 150, photo-cell relay switch 168, the coil to relay 163, pole B of relay 164, the high stop Micro-switch 85 and power line 152. This latter circuit starts the motor 70 driving the poise 62 outward, and the weighing process is repeated.

During check weighing the poise 62 only remains in the weight indicating position for an instant, because almost immediately after the circuit for driving the poise 62 outward is broken, the circuits for driving it inward are established. Since the weight recorder 86 is driven in geared relation to the motor 70 along with the poise 62 it will be seen that provision must be made for energizing the recorder during the short period between when the motor stops after driving the poise out and when it starts again to drive the poise in. To accomplish this, the recorder is energized by a circuit which includes the power line 150, pole A of relay 163 in the de-energized position, the weight recorder 86, pole B of relay 162 in the de-energized position, low stop Micro-switch 79, and power line 152. As was explained, the two relays 162 and 163 are de-energized for only an instant during check weighing, but nevertheless it is sufficient time to actuate the recorder 86.

VII. *Method of determining weight*

It has been explained that the poise motor stops when the beam 44 passes the photo-cell 90 and that the weight of a unit on the scale is read with reference to the position of the poise at that time. It has also been explained that due to the way in which the weigh beam is suspended, when the weigh beam is in equilibrium and at rest, the angle of the weigh beam above or below the horizontal represents a calculable weight not indicated by the position of the poise. Viewing these two factors together and assuming that the weigh beam must travel a certain distance below the photo-cell before settling down, it will be apparent that the accuracy of the scale depends upon how near to the same place the weigh beam will settle down after weighing objects of various weights. If the beam settles down on the horizontal after weighing an object of one weight, and settles down ¼° below the horizontal after weighing another object of different weight, and a ¼° angle of the beam represents one pound, then the poise reading will be one pound in error. On the other hand, if while weighing various weights the beam always settles down in the horizontal position after falling below the photo-cell, its final resting position can be ignored and the true weight can be read from the poise alone without waiting for the beam to settle down. Furthermore, it will be seen that the final resting position of weigh beam need not be in the horizontal so long as it is always in the same place, because, if it is at an angle above or below the horizontal, the poise reading may easily be calibrated to compensate for such angle.

The factor which controls how far past the photo-cell the weigh beam will settle down is the sum of the moments acting about the weigh beam fulcrum at the instant it passes the photo-cell. If the moment is equivalent to one pound, and ¼° travel of the weigh beam represents one pound, then the weigh beam will settle down ¼° past the photo-cell. Of course, there will be a slight overtravel of the poise after the photo-cell causes the motor 70 to de-energize, but it may be regarded as a constant, and ignored for purposes of this discussion. Furthermore, the over-travel of the synchronous motor herein described is extremely small due to the electrical damping action of its permanent magnet armature.

It will be understood that the terminology employed herein is not exactly the same as that normally applied to a lever at rest. When the moments of force of a given fulcrum are equal and the lever is at rest, obviously the lever will not be in motion. On the other hand, when the sum of the moments of force are not equal, then the lever will be in a dynamic condition of motion. We refer herein to the dynamic moment about a fulcrum which causes the said beam to move in a given direction.

Therefore, if the forces acting on the weigh beam can be made constant as the weigh beam passes the photo-cell while successively weighing objects of different weights, extreme accuracy may be attained. In analysing the factors which determine these forces, it will be seen that the position of the poise 62 and the angle of the weigh beam are the controlling factors. By way of example, let us assume that an object weighing 100 lbs. is placed on the scale, that the poise is placed in a position on the weigh beam representing 97 lbs., and that the weigh beam is placed at an angle above the horizontal representing 4 lbs. It is obvious that under such conditions the force urging the weigh beam to fall is equivalent to one pound on the scale. If left alone, the beam would fall to an angle representing 3 lbs., and after oscillating, come to rest there. Going one step further with this assumed example, if the poise were moved out of the weigh beam at a rate sufficient to keep this force equivalent to one pound as the weigh beam falls, and if there were no damping on the weigh beam, the weigh beam would accelerate during its fall, and then, in order to maintain the one pound force equivalent, the poise would also have to accelerate. Such an accelerated movement of the poise would be extremely difficult to achieve mechanically.

We have been able to attain a constant moving force about the fulcrum by driving the poise out the weigh beam at a constant rate and by providing sufficient damping for the weigh beam to create a damping counterforce equal to this force when the weigh beam is dropping at a velocity expressed in terms of weight equal to the velocity of the poise expressed in terms of weight. In a sense the damping is critical within limits because the weigh beam is free to travel only a few degrees, therefore the damping must permit sufficient acceleration to bring the weight velocity ratio of the weigh beam up to that of the poise within a fall of substantially less than one degree, but yet the damping must not permit the beam to reach a weight velocity ratio substantially greater than the poise in that space and thereby cause the moment to fluctuate. Such fluctuation in itself is not harmful, however, if it has substantially subsided before the weigh beam passes the photo-cell. The damping is accomplished by dashpot 63 mounted on frame 20 and with plunger 71 operating in a viscous medium in dashpot 68. The damping may be varied by increasing or decreasing the viscosity of the medium or by varying the surface area of the plunger 71.

In the preferred embodiment herein described the poise 62 travels out the weigh beam at a constant velocity expressed in terms of weight of 3¾ lbs. per sec. The weigh beam is free to swing through 1½° above and below the horizontal. If the poise is at 95 lbs. and a 100 lb. bag is thrown on the scale, a moment equivalent of 5 lbs. immediately tips the weigh beam upward. As the beam passes the photo-cell 90 at about +0°9′ angle above the horizontal, the motor 70 is energized and the poise starts out. The beam arrives at about +1°12′ angle in a little over ¼ sec., and since such an angle represents about 4 lbs., and since the poise will have moved outward a distance equivalent to about a pound in that time, the moment will thereafter commence changing to one urging the weigh beam downward. In this embodiment, a moment equivalent of 1/10 lb. is sufficient to start the beam downward and the damping is adjusted to permit the beam to reach a velocity equivalent to 3¾ lbs. per sec. in about ⅓ second thereafter. Under these circumstances, we have found that if the beam passes the photo-cell when the beam is approximately 0°9′ above the horizontal, it will settle down on the horizontal thereafter.

It is to be noted that the spring nature of the flexure plate suspension herein employed provides an increasing resistance to movement of the weigh beam the greater its angle is above or below the horizontal. While this resistance does not effect the accuracy of the scale in any way, it greatly facilitates repeated weighing by preventing the weigh beam from swinging too far up before starting downward.

It will also be noted that if the bag being weighed is only 96 lbs. under the above outlined conditions, the beam will start to fall from a position only slightly above the photo-cell and will still be accelerating when it passes the photo-cell. Therefore, the moment equivalent will not yet have reached its full value and the beam will settle down above the horizontal. Under such circumstances the location of the poise will represent a weight below the actual weight of the unit. Of course, errors of this type may obviously be eliminated by starting with the poise further back. This is easily regulated by adjustment of cam 80 or switch 79.

VIII. *The rate of check weighing*

The rate of check weighing depends upon how far below the weight of the object the poise starts on the weigh beam scale. If the poise starts at 95 lbs. and the average unit is 100 lbs., it will take the poise 1⅓ sec. to travel up to 100 lbs. and 1⅓ sec. to travel back to 95 lbs. Then adding approximately 1/10 sec. to account for starting and stopping, it will be seen that better than 21 weighings per minute are possible. In actual practice 30 weighings per minute have been attained with the scale of our invention. On the other hand if the average weight is 103 lbs. it will take the poise longer to travel out and back, and the rate of check weighing will be slower.

A more crude method of check weighing but one which may conceivably attain greater speed is to provide an upon trig-loop stop 67 adjacent to photo-cell 90, and to position the said stop so that the weigh beam may pass the photo-cell 90, no further than an amount sufficient to actuate it. Thus the instant when the beam falls away from the said stop, the photo-cell simultaneously opens the circuit to the coil of relay 163, thereby stopping the motor 70. The accuracy of this method is somewhat impaired by possible variables arising from changing conditions of the stop 67 and from changing conditions of inertia of the entire scale system when different weights are on the platform. However, such variables may be minimized by providing stop 67 with a knife edge contact, and by calibration for check weighing within a narrow range.

The advantage of this latter method is that the weight is taken the instant that the weigh beam starts to drop, and since the moment necessary to cause the beam to drop away from stop 67 will be constant under all practical conditions, the final resting place of the weigh beam may be predicted with reasonable accuracy.

IX. *Belt type discharge apparatus and control circuits*

In Figs. 1–4 a belt type discharge apparatus is illustrated mounted on the platform 30. This apparatus may include an endless belt 94 mounted on two large rolls 96 and 97 suitably supported for rotation in bearings (not shown), and driven by a reversible motor 98 through the medium of a chain drive indicated at 100. Centrally between the large rolls 96 and 97 it may be convenient to provide small supporting rolls 102 to bear the weight of heavy objects being weighed. The discharge motor 98 is herein shown as being suspended directly from the bottom of the scale platform in order to avoid weight variables which might arise if the discharge motor drives from a fixed position. The belt type discharge, of course, is adaptable only for discharge in two ways, and therefore may be employed only where it is not necessary to distinguish between whether a package is rejected for being overweight or underweight.

Circuits for controlling the direction of rotation of discharge motor 98 are shown in Fig. 15. If units are within the correct weight range, the motor 98 discharges them in one direction, whereas if they are not within that range, the motor 98 discharges them in the other direction. The reversal of direction of motor 98 is effected by a double pole, double throw relay 166 which is energized only when a unit is under or overweight at the moment the weigh beam 44 drops below the photo-cell 99. If a unit is under or overweight cam 84 or 82 closes switch 81 or 83, respectively and when the relay 163 de-energizes due to the action of photo-cell 90 a circuit is made which includes power line 150, the coil for relay 166, either switch 81 or switch 83, pole B of relay 162 in the de-energized position, the low-stop Micro-switch 79 and the power line 152. When energized, the relay 166 establishes circuits changing the direction of the current driving the motor 98 and also closes a holding circuit which keeps the relay 166 energized as long as the motor 98 is energized, regardless of the position of cams 82 and 84. In this way the motor 98 will continue to drive in one direction once it starts, and since it is in series with low stop switch 79, it will continue to drive until low stop switch 79 opens. In order to prevent excessive running of the discharge motor 98, a timer (not shown) may be inserted in its circuit.

X. *Tilting platform type discharge and control circuits*

Another type of discharge apparatus is illustrated in Figs. 10–14 and includes a large and flat box shaped cover 104 adapted to fit on and overlap the platform 30. The cover 104 is provided with three rigidly mounted horizontal bars 106 mounted on lugs 108 along the inside and parallel to three sides thereof. When the cover 104 is in the horizontal position on the platform 30, the bars 106 rest in V-blocks 110 and 112. For the purpose of tilting the cover 104 to discharge a unit which has been weighed, an air cylinder 114 is provided mounted on a universal joint 115 on the base of the scale centrally beneath the scale platform, and operates by means of a piston 116 which bears upwards into a socket 118 in the cover 104, to elevate the cover 104, and tilt it depending upon which side of the cover is held down. Selective discharging is performed by solenoid controlled hinge pins 120, 122 and 124 which pass through holes 126 in V-blocks 112 and retain the bar 106 resting therein. Of course the pins 120, 122 and 124 are controlled so as to operate only one at a time in retaining the bars 106. Controls for this system will be discussed presently.

The tilting discharge system shown in Figs. 10–14 is capable of more variety than the belt-type discharge, in that units rejected for being overweight may be rejected in a different direction from units rejected for being underweight.

The weighing apparatus for the tilting type discharge is the same as discussed above for the belt type, however, since the cover 104 must be raised and lowered by the air cylinder 114 and since the hinge pins 120, 122 and 124 must be controlled to cause the cover 104 to tilt in one of three different ways, the control circuits for the tilting discharge apparatus (see Fig. 16) are substantially different.

Immediately following the instant when the beam drops below the photo-cell 90 causing the relay 168 to de-energize and break the circuit to the coil of relay 163, a circuit is established which actuates the piston 116 of the air cylinder 114 upward. This circuit includes the power line 150, pole A of relay 163 in the de-energized position, the coil of a delayed action relay 174, pole B of relay 162 in the de-energized position, the low stop Micro-switch 79 and power line 152. The delayed action relay 174 pauses ¼ sec. and then closes a circuit to a solenoid 176 which positions valves (not shown) actuating the piston 116 upward. At this time hinge pins 120, 122 and 124 must be in position in order to tilt cover 104 properly. Solenoids 121, 123 and 125 respectively serve this function. Hinge pin 120 is normally engaged in its V-block 112 and causes the cover 104 to tilt in the direction representing proper weight. Therefore, if the unit on the scale weighs within the prescribed range none of the solenoids 121, 123 or 125 are energized. As the piston drives upward relieving the weight of the unit on the platform, the weigh beam drops, making the mercury contact 92, energizing relays 161 and 162 and starting the poise inward as previously described. Since the delayed action relay 174 depends upon relay 162 being de-energized, the circuit to its coil is broken when relay 162 energizes and solenoid 176 is de-energized. Thereafter, as the cover 104 tilts, the air cylinder 114 tilts correspondingly as shown in Fig. 11 and eventually closes a Micro-switch 180 which closes a circuit including power line 150, switch 180, solenoid 177 and power line 152. Solenoid 177 re-positions the valve (not shown) of the air cylinder 114 causing the piston 116 to be retracted downward and the cover 104 return to normal position.

If the unit on the scale is overweight, switch 81 will be closed at the moment the photo-cell breaks the circuit to the coil of relay 163, and a circuit will be established simultaneously to engage hinge pin 124 and retract hinge pin 120. This latter circuit includes the power line 150, the coil to a relay 173, switch 81, pole B of relay 162 in the de-energized position, the low stop switch 79, and power line 152. Relay 173 in turn establishes two circuits, one to solenoid 121 including power line 150, pole A of relay 173, solenoid 121 and power line 152; and the other circuit to solenoid 125 including power line 150, pole A of relay 173, solenoid 125, pole B of relay 173 and power line 152. The coil for relay 173 depends upon relay 162 remaining de-energized with the result that its circuit is broken when the piston 116 relieves the weight on the platform. Breaking these circuits would de-energize the hinge pin solenoids if other means were not provided to keep them energized while the platform is being tilted. To accomplish this, we provide holding circuits which include power line 150, switches 183 and 187 (actuated by hinge pins 120 and 124 respectively), a switch 189, low stop switch 79, and power line 152. However, since the low stop switch 79 will probably be opened by cam 80 before tilting is completed, we provide a second switch 188 adapted to by-pass low stop switch 79. Switches 189 and 188 are mounted on platform 30 beneath the cover 104 as may be seen in Figs. 11 and 13 and are operated by the cover as it rises or falls. When the cover is in position on the platform, switch 189 is closed and switch 188 opened. As the platform rises switch 188 closes and switch 189 being positioned slightly above switch 188, opens immediately thereafter. Since the tilting action starts before the poise commences to return to the inner position on the weigh beam, low stop switch 79 is still closed and the holding circuits are in no immediate danger of being broken thereby. Then as the cover 104 rises switch 188 closes and establishes the circuit which by-passes low stop switch 79. With the cover up, then, the holding circuits will remain energized until the cover lowers, closes switch 189 and opens switch 188. At that time if low stop switch 79 is still closed the solenoids 121 and 125 will remain energized, but will de-energize when low stop switch 79 opens.

If the unit on the scale is underweight, switch 81 will be open and switch 83 closed at the instant of weighing. A relay 172 will be energized at that time and will cause circuits to be established which will energize solenoids 121 and 123 to actuate hinge pins 120 and 122 respectively and thereby tilt the cover 104 in the opposite direction. Relay 172 is likewise initially dependent upon relay 162 remaining de-energized and therefore holding circuits for solenoids 121 and 123 together are established by action of hinge pins 120 and 122 tripping switches 183 and 185 all respectively. These latter holding circuits are in series with switches 188 and 189 and are controlled thereby in an identical manner to those discussed above for solenoids 121 and 125 together.

XI. *Controls for changing to conventional weighing, testing, etc.*

If it is desired to weigh an object of substantially different weight from those being check weighed it is necessary to isolate the stop switches 79, 81, 83 and 85 as well as eliminate the operation of relays 164, 165 and 166. This may be done by means of a double throw, three pole master switch 154 which, when thrown to the conventional weighing position, makes two circuits which by-pass the said stop switches, and breaks the circuit to the coil of relay 164 coming from pole A of relay 163. In this way relays 161, 162 and 163 and the motor 70 may be controlled only by the photo-cell 90 and the mercury switch 92, and weights may be taken anywhere on the poise scale.

If it is desired to run a series of tests with the master switch 154 in the check weighing position, but without discharging the test weight from the scale, a double pole switch 156 may be employed to break the circuit to motor 98 and the circuit to pole A of relay 164.

A switch 158 may be employed to isolate one of the intermediate stop switches 81 and 83, while leaving the other in circuit. Further variations of control circuits including overload switches 132 and 134, will be apparent to those skilled in the art.

XII. *Variations*

Numerous minor variations of the scale of our invention will be apparent to those skilled in the art. For instance, by a simple re-positioning of elements, it is possible to take the weight reading with the weigh beam rising instead of falling. Pendulum type scales furthermore could be rigged to correspond to the scale of our invention by analogy. Also details with respect to the type of contacts employed may readily be changed. Magnetically operated switches may obviously replace the photocell 90 or the mercury switch 92. Therefore it is not intended to confine the invention to the precise form of the embodiments herein shown but rather to limit it in terms of the appended claims.

Having thus described our invention, what we claim as new and desire to secure by Letters Patent of the United States is:

1. A scale comprising in combination a weigh beam having a fulcrum, a poise movable thereon, a contact operatively associated with the weigh beam and closed thereby when the weigh beam passes the contact in one direction in response to a moment in that direction about the weigh beam fulcrum, poise moving mechanism actuated by the said contact when so closed for moving the poise along the weigh beam in counterrelation to the said moment thereby reversing the moment, causing the weigh beam to re-pass the said contact, open it and stop the poise moving mechanism; and means for accurately positioning the weigh beam at a final resting place after it re-passes the said contact, said means comprising a motor adapted both for moving the poise at a constant velocity and for decelerating the poise at a constant rate, and mechanism for rendering the moment about the weigh beam fulcrum constant at the instant when the weigh beam re-passes the contact.

2. A scale comprising in combination a lever suspension system in which the lever fulcrums and pivots are suspended from above by flexure plates, a weigh beam having a fulcrum, a poise movable thereon, a contact operatively associated with the weigh beam and closed thereby when the weigh beam passes the contact in one direction in response to a moment in that direction about the weigh beam fulcrum, poise moving mechanism actuated by the said contact when so closed for moving the poise along the weigh beam in counterrelation to the said moment thereby reversing the moment, causing the weigh beam to re-pass the said contact, open it and stop the poise moving mechanism; and means for accurately positioning the weigh beam at a final resting place after it re-passes the said contact, said means compressing a motor both for moving the poise at a constant velocity and to decelerate the poise at a constant rate, and mechanism adapted to render the moment about the weigh beam fulcrum constant at the instant when the weigh beam re-passes the contact.

3. A scale comprising in combination a platform, a lever suspension system for the platform, flexure plates forming suspension type pivots and fulcrums for the said lever system, a weigh beam actuated by the said levers, a poise movable on the weigh beam, a contact operatively associated with the weigh beam and closed thereby when the weigh beam passes the contact in one direction in response to a moment in that direction about the weigh fulcrum, means actuated by the said contact when closed to reverse the said moment by repositioning the poise thereby causing the weigh beam to re-pass the contact and open it; means for moving the poise at a constant velocity and decelerating it at a constant rate, and means for causing the weigh beam to re-pass the said contact under the same moment conditions for various weights.

4. The scale combination defined in claim 3 further characterized by a screw mounted for rotation on the weigh beam adapted to drive the poise axially of the weigh beam when turned, and a gear for turning the screw mounted with its pitch circle tangent to the weigh beam fulcrum axis.

5. The scale combination defined in claim 4 further characterized by the axis of the said gear being parallel to the weigh beam axis.

6. A scale comprising in combination with a weigh beam, a poise movable thereon, means including a constant speed motor and a central contact actuated by the weigh beam when the weigh beam is in a given position relative to the horizontal for driving the poise axially of the weigh beam only at a substantially constant rate and to cause the weigh beam to swing away from the said given position by creation of a moving force about the weigh beam fulcrum, means for stopping the poise when the weigh beam so swings away from the said position, and means for taking a weight reading from the position of the poise after it has been so stopped and without reference to further swinging motion of the weigh beam.

7. Apparatus for determining the weight of a unit, comprising a scale of the counterbalance type, the scale being provided with a free moving weigh beam, a movable poise on the weigh beam, means for placing the poise on the weigh beam in such a position that when the unit to be weighed is placed on the scale the weigh beam elevates to a starting position substantially above the horizontal, means for moving the poise outwardly along the weigh beam when the weigh beam is in the said starting position whereby the poise eventually counterbalances the weight of the unit and starts the weigh beam in a downward swinging path, damping means for the weigh beam, and means for stopping the outward motion of the poise before the weigh beam reaches the horizontal position, the rate of movement of the poise, the damping of the weigh beam and the said starting position being so related one to the other that the moment causing the weigh beam to fall will reach a constant value prior to the stopping of the poise.

8. A checking scale comprising in combination a weigh beam, a movable poise on the said beam, a lower contact, the said beam adapted to make the lower contact when no weight is on the scale, means actuated by the lower contact automatically moving the poise to a starting position representing a weight substantially below the weight of a unit to be check weighed, an upper contact, the weigh beam adapted to make the said upper contact when the said beam rises by reason of placing the unit to be check weighed on the scale while the poise is in the said starting position, means actuated by the upper contact automatically moving the poise out along the arm at a substantially constant rate whereby a moment about the weigh beam fulcrum is created causing the weigh beam to fall and break the upper contact, and damping means for rendering the said moment substantially constant before the upper contact is so broken.

9. The checking scale described in claim 8 further characterized by means for reading the weight of the unit with reference to the position of the poise at the instant the upper contact is so broken, and means for moving the poise back to the said starting position immediately after the upper contact is so broken without waiting for the lower contact to be made.

10. A counterbalance type scale comprising a free swinging weigh beam, a movable poise on the weigh beam, means for driving the poise at a constant rate, and for stopping the movement of the poise at a known interval after receipt of a signal to stop, damping means for the weigh beam adapted to render the moment of the weigh beam constant as the weigh beam swings towards a horizontal position by virtue of the poise being driven at a constant rate, and means for stopping the poise when the weigh beam is approaching the horizontal position at an angle away from the horizontal equivalent to the said constant moment, whereby it may be calculated that the weigh beam will settle down in the horizontal position after the poise has been so stopped but whereby the scale may be read with reference to the position of the poise without the necessity for waiting until the weigh beam actually comes to a stop.

11. The scale defined in claim 10 further characterized by a flexure plate lever suspension system one property of which is to provide an increasing resistance to movement of the weigh beam away from the horizontal.

12. A checking scale comprising in combination a weigh beam, a poise movable thereon, a contact operatively associated with the weigh beam and closed thereby when the weigh beam passes the contact in one direction in response to a moment in that direction about the weigh beam fulcrum, a stop adjacent to the said contact preventing further movement past the said contact in the said direction, poise moving mechanism actuated by the said contact when so closed, for moving the poise along the weigh beam in counterrelation to the said moment thereby reversing the moment, causing the weigh beam to re-pass the said contact, open it and stop the poise moving mechanism; and means for accurately positioning the weigh beam at a final resting place after it re-passes the said contact, comprising a motor both for moving the poise at a constant velocity and for decelerating the poise at a constant rate, and mechanism for rendering the moment about the weigh beam fulcrum constant at the instant when the weigh beam re-passes the contact.

References Cited in the file of this patent
UNITED STATES PATENTS

| | | |
|---|---|---|
| 1,049,535 | Rosenfield | Jan. 7, 1913 |
| 1,294,408 | Crane | Feb. 18, 1919 |
| 1,328,319 | Crane | Jan. 20, 1920 |
| 1,347,206 | Buckingham | July 20, 1920 |
| 1,359,272 | Pool | Nov. 16, 1920 |
| 1,484,358 | Norton | Feb. 19, 1924 |
| 1,616,503 | Merrick | Feb. 8, 1927 |
| 1,827,758 | McKim | Oct. 20, 1931 |
| 1,962,231 | Brunt | June 12, 1934 |
| 2,025,606 | Nichols | Dec. 24, 1935 |
| 2,127,511 | Graf et al. | Aug. 23, 1938 |
| 2,222,140 | DeIongh | Nov. 19, 1940 |
| 2,307,695 | Mansbendel | Jan. 5, 1943 |
| 2,489,899 | Kniazuk | Nov. 29, 1949 |
| 2,508,796 | Pekar | May 23, 1950 |
| 2,622,868 | Yeasting | Dec. 23, 1952 |